(12) United States Patent
Ogawa

(10) Patent No.: US 10,150,488 B2
(45) Date of Patent: Dec. 11, 2018

(54) ACTUATOR UNIT

(71) Applicant: KAYABA INDUSTRY CO., LTD., Tokyo (JP)

(72) Inventor: Takayuki Ogawa, Kanagawa (JP)

(73) Assignee: KYB Corporation, Tokyo (JP)

( * ) Notice: Subject to any disclaimer, the term of this patent is extended or adjusted under 35 U.S.C. 154(b) by 53 days.

(21) Appl. No.: 14/766,808

(22) PCT Filed: Jan. 29, 2014

(86) PCT No.: PCT/JP2014/051958
§ 371 (c)(1),
(2) Date: Aug. 10, 2015

(87) PCT Pub. No.: WO2014/132732
PCT Pub. Date: Sep. 4, 2014

(65) Prior Publication Data
US 2016/0001795 A1    Jan. 7, 2016

(30) Foreign Application Priority Data

Feb. 26, 2013   (JP) .................................. 2013-035238

(51) Int. Cl.
*F15B 1/26* (2006.01)
*B61F 5/24* (2006.01)
(Continued)

(52) U.S. Cl.
CPC .............. *B61F 5/24* (2013.01); *F15B 11/028* (2013.01); *F16F 15/02* (2013.01); *F15B 2211/20538* (2013.01); *F15B 2211/30565* (2013.01); *F15B 2211/40507* (2013.01); *F15B 2211/415* (2013.01); *F15B 2211/41581* (2013.01)

(58) Field of Classification Search
CPC .......... B61F 5/24; B61F 5/245; F15B 11/028; F15B 2211/415; F15B 2211/30565; F15B 2211/40507; F15B 2211/41581
See application file for complete search history.

(56) References Cited

U.S. PATENT DOCUMENTS

| | | | |
|---|---|---|---|
| 6,360,538 | B1 | 3/2002 | McGowan et al. |
| 2011/0192157 | A1 | 8/2011 | Ogawa |

FOREIGN PATENT DOCUMENTS

| | | |
|---|---|---|
| JP | 1975-127172 U | 10/1975 |
| JP | 1981-070359 U | 6/1981 |

(Continued)

*Primary Examiner* — Xuan Lan Nguyen
(74) *Attorney, Agent, or Firm* — Rabin & Berdo, P.C.

(57) ABSTRACT

An actuator unit includes a rod side chamber and a piston side chamber defined by a piston; a tank; a first opening/closing valve communicating the rod side chamber with the piston side chamber; a second opening/closing valve communicating the piston side chamber with the tank; an suction passage allowing a working fluid to flow from the tank toward the piston side chamber; a rectifying passage allowing the working fluid to flow from the piston side chamber toward the rod side chamber; a pump supplying the working fluid to the rod side chamber; a first discharge passage and a second discharge passage respectively communicating the rod side chamber to the tank; a first passive valve provided on the first discharge passage; a second passive valve provided on the second discharge passage; and a third passive valve configured to communicate and block the first discharge passage.

5 Claims, 7 Drawing Sheets

(51) Int. Cl.
  *F15B 11/028* (2006.01)
  *F16F 15/02* (2006.01)

(56) References Cited

FOREIGN PATENT DOCUMENTS

| | | |
|---|---|---|
| JP | 1983-041798 U | 3/1983 |
| JP | 1984-043567 U | 3/1984 |
| JP | 61-244903 A | 10/1986 |
| JP | 61-294031 A | 12/1986 |
| JP | 10-073101 A | 3/1998 |
| JP | 2001-065504 A | 3/2001 |
| JP | 2002-066800 A | 3/2002 |
| JP | 2009-180377 A | 8/2009 |
| JP | 2010-065797 A | 3/2010 |
| JP | 2010-137795 A | 6/2010 |
| JP | 2011-089537 A | 5/2011 |
| JP | 2011-202675 A | 10/2011 |

ACTUATOR UNIT

TECHNICAL FIELD

The present invention relates to an actuator unit.

BACKGROUND ART

An actuator unit is used in a railway vehicle, for example, with being interposed between a vehicle body and a truck in order to suppress vibration in a left-right direction relative to an advancing direction of the vehicle body.

JP2010-65797A discloses an actuator unit including: a cylinder; a piston slidably inserted into the cylinder; a rod inserted into the cylinder and coupled to the piston; a rod side chamber and a piston side chamber defined within the cylinder by the piston; a tank; a first opening/closing valve provided on midway of a first passage that communicates the rod side chamber with the piston side chamber; a second opening/closing valve provided on midway of a second passage that communicates the piston side chamber with the tank; a pump that supplies a working fluid to the rod side chamber; a motor that drives the pump; a discharge passage that communicates the rod side chamber with the tank; and a variable relief valve provided on midway of the discharge passage.

According to this actuator unit, a direction of an output thrust is determined by appropriately opening and closing the first opening/closing valve and the second opening/closing valve, whereupon the pump is rotated by the motor at a fixed speed such that the fluid is supplied into the cylinder at a fixed flow rate. Meanwhile, an internal pressure of the cylinder is controlled by adjusting a relief pressure of the variable relief valve, and in so doing, a thrust of a desired magnitude can be output in a desired direction.

SUMMARY OF INVENTION

In this type of actuator unit, the variable relief valve is required to control the magnitude of the thrust. However, the variable relief valve is structurally extremely complicated and therefore large. Hence, a driver (a driving device) is required to drive the variable relief valve. Accordingly, the actuator increases in size, making it more difficult to install the actuator in a railway vehicle or the like, and moreover, an overall cost of the actuator increases, making the actuator uneconomical.

To solve this problem, a passive valve having a pressure-flow rate characteristic according to which pressure loss is determined unambiguously in relation to a flow rate passing through the valve may be provided in place of the variable relief valve, and the pressure in the cylinder may be controlled by adjusting a discharge amount of the pump. In so doing, reductions in the size and cost of the actuator unit can be achieved. In this type of actuator unit, as shown by a dotted line F7 in FIG. 8, no problems arise as long as the pressure-flow rate characteristic of the passive valve is set such that the pressure loss has a certain magnitude even when a flow β1 passing through the passive valve is comparatively small, thereby ensuring that the pressure in the cylinder can reach a target pressure a at a comparatively early stage.

However, the actuator unit described above can also be caused to function as a damper, and a damping characteristic (damping force variation relative to piston speed) of the actuator unit when functioning as a damper is determined by the pressure-flow rate characteristics of the passive valve.

Therefore, in a case where the pressure-flow rate characteristic of the passive valve is set such that when the flow rate passing through the valve is small, the pressure loss is comparatively small, as shown by a solid line F8 in FIG. 8, for example, in order to realize a desired damping characteristic in the actuator unit, the flow required to reach the target pressure a becomes extremely large when the actuator unit is used as an actuator.

In other words, when an optimum passive valve for realizing the desired damping characteristic is employed, the discharge amount of the pump may increase, depending on the pressure-flow rate characteristic of the passive valve. Accordingly, problems such as an increase in power consumption due to an increase in a motor speed, a reduction in responsiveness due to an increase in a variation rate of the motor speed, and a need for increased durability in the motor and the pump may arise. Hence, the pressure-flow rate characteristic of the passive valve is limited, and as a result, it may be impossible to realize the desired damping characteristic.

An object of the present invention is to provide an actuator unit with which a desired damping characteristic can be realized easily even when a passive valve is used and a pressure in a cylinder is controlled by adjusting a discharge amount of a pump.

According to one aspect of the present invention, an actuator unit includes a cylinder; a piston slidably inserted into the cylinder, the piston defining a rod side chamber and a piston side chamber in the cylinder; a rod inserted into the cylinder and coupled to the piston; a tank; a first opening/closing valve provided on a first passage that communicates the rod side chamber with the piston side chamber; a second opening/closing valve provided on a second passage that communicates the piston side chamber with the tank; an suction passage configured to allow a working fluid to flow only from the tank toward the piston side chamber; a rectifying passage configured to allow the working fluid to flow only from the piston side chamber toward the rod side chamber; a pump configured to supply the working fluid to the rod side chamber; a motor configured to drive the pump; a first discharge passage and a second discharge passage that respectively communicate the rod side chamber to the tank; a first passive valve provided on the first discharge passage, the first passive valve having a first pressure-flow rate characteristic; a second passive valve provided on the second discharge passage, the second passive valve having a second pressure-flow rate characteristic; and a switch valve configured to communicate and block at least one of the first discharge passage and the second discharge passage.

DESCRIPTION OF EMBODIMENTS

Embodiments of the present invention will be described below with reference to the attached figures.

Figure 1:
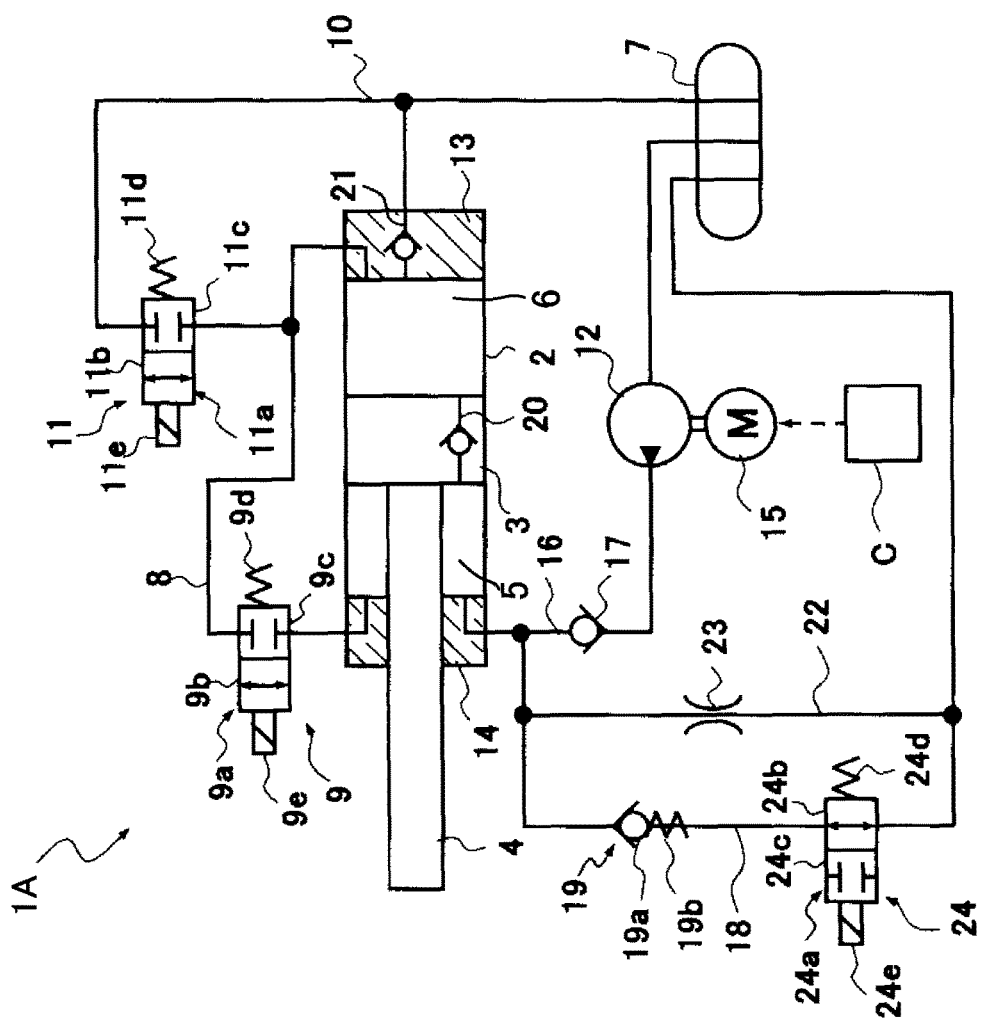
FIG. 1 is a circuit diagram showing an actuator unit according to a first embodiment of the present invention.

As shown in FIG. 1, an actuator unit 1A according to a first embodiment of the present invention includes a cylinder 2, a piston 3 slidably inserted into the cylinder 2 and defining a rod side chamber 5 and a piston side chamber 6 in the cylinder 2, a rod 4 inserted into the cylinder 2 and coupled to the piston 3, a tank 7, a first opening/closing valve 9 provided on midway of a first passage 8 that communicates the rod side chamber 5 with the piston side chamber 6, a second opening/closing valve 11 provided on midway of a second passage 10 that communicates the piston side chamber 6 to the tank 7, an suction passage 21 configured to allow a working fluid to flow only from the tank 7 toward the piston side chamber 6, a rectifying passage 20 configured to allow the working fluid to flow only from the piston side chamber 6 toward the rod side chamber 5, a pump 12 configured to supply the working oil to the rod side chamber 5, and a motor 15 configured to drive the pump 12.

The actuator unit 1A further includes a first discharge passage 18 and a second discharge passage 22 respectively communicate the rod side chamber 5 with the tank 7; a first passive valve 19 provided on midway of the first discharge passage 18, the first passive valve 19 having a first pressure-flow rate characteristic relative to the working fluid flowing from the rod side chamber 5 into the tank 7; a second passive valve 23 provided on midway of the second discharge passage 22, the second discharge passage 22 having a second pressure-flow rate characteristic relative to the working fluid flowing from the rod side chamber 5 into the tank 7; and a third opening/closing valve (a switch valve) 24 configured to communicate and block the first discharge passage 18.

Working oil is charged into the rod side chamber 5 and the piston side chamber 6 as the working fluid. A gas is charged into the tank 7 in addition to the working oil. The working fluid used to operate the actuator unit 1A may be a fluid other than working oil, and may also be a gas. There is no particular need to set the tank 7 in a pressurized condition by charging the gas in a compressed condition.

The actuator unit 1A is caused to perform an expansion operation by driving the pump 12 using the motor 15 in a condition where the first passage 8 is set in a communicative condition by the first opening/closing valve 9 and the second opening/closing valve 11 is closed. By supplying working oil to the cylinder 2 in this condition, the actuator unit 1A is caused to perform the expansion operation. The actuator unit 1A is caused to perform a contraction operation by driving the pump 12 using the motor 15 in a condition where the second passage 10 is set in a communicative condition by the second opening/closing valve 11 and the first opening/closing valve 9 is closed. By supplying working oil to the cylinder 2 in this condition, the actuator unit 1A is caused to perform the contraction operation.

Respective parts will now be described in detail. The cylinder 2 is formed in a tubular shape, wherein a right end in FIG. 1, serving as one end portion, is closed by a lid 13 and an annular rod guide 14 is attached to a left end in FIG. 1 serving as the other end portion. Further, the rod 4 slidably inserted into the cylinder 2 is slidably inserted into the rod guide 14. The rod 4 projects to the exterior of the cylinder 2 at one end, and another end is coupled to the piston 3 inserted into the cylinder 2 to be free to slide.

A gap between an outer periphery of the rod 4 and the cylinder 2 is sealed by a seal member, not shown in the figures. As a result, the interior of the cylinder 2 is maintained in an airtight condition. As described above, working oil is charged as the working fluid into the rod side chamber 5 and the piston side chamber 6 defined within the cylinder 2 by the piston 3.

In the actuator unit 1A, the rod 4 is formed such that a sectional area thereof is half a sectional area of the piston 3, whereby a pressure receiving surface area of the piston 3 on the rod side chamber 5 side is half a pressure receiving surface area thereof on the piston side chamber 6 side. Hence, when a pressure in the rod side chamber 5 is set to be identical during the expansion operation and the contraction operation, an equal thrust is generated during both expansion and contraction. Further, a flow rate relative to a displacement amount of the actuator unit 1A is identical on both the expansion and the contraction sides.

To describe this in more detail, when the actuator unit 1A is caused to perform the expansion operation, the rod side chamber 5 and the piston side chamber 6 communicate with each other such that the pressure in the rod side chamber 5 and the pressure in the piston side chamber 6 are equal. As a result, thrust obtained by multiplying this pressure by a pressure receiving surface area difference between the rod side chamber 5 side and the piston side chamber 6 side of the piston 3 is generated by the actuator unit 1A. When the actuator unit 1A is caused to perform the contraction operation, on the other hand, communication between the rod side chamber 5 and the piston side chamber 6 is blocked such that the piston side chamber 6 communicates with the tank 7. As a result, thrust obtained by multiplying the pressure in the rod side chamber 5 by the pressure receiving surface area on the rod side chamber 5 side of the piston 3 is generated by the actuator unit 1A. Thus, during both expansion and contraction, the thrust generated by the actuator unit 1A takes a value obtained by multiplying the pressure in the rod side chamber 5 by half the sectional area of the piston 3. Therefore, the thrust of the actuator unit 1A can be controlled by adjusting the pressure in the rod side chamber 5 to a target pressure during both the expansion operation and the contraction operation. Since the pressure receiving surface area on the rod side chamber 5 side of the piston 3 is set at half the pressure receiving surface area on the piston side chamber 6 side, when identical thrust is generated on both the expansion and contraction sides, the pressure in the rod side chamber 5 can be made identical during both expansion and contraction, and therefore control is simple. Further, the flow rate relative to the displacement amount is also identical, and therefore an identical response is obtained on both the expansion and contraction sides. Furthermore, the thrust of the actuator unit 1A on the expansion and contraction sides can be controlled likewise using the pressure in the rod side chamber 5 even when the pressure receiving surface area on the rod side chamber 5 side of the piston 3 is not set at half the pressure receiving surface area on the piston side chamber 6 side.

A left end in FIG. 1 of the rod 4, which is the end projecting to the exterior of the cylinder 2, and the lid 13 that closes the right end of the cylinder 2 are provided with attachment portions, not shown in the figures. The actuator unit 1A is interposed between a vehicle body and a vehicle axle of a vehicle by these attachment portions.

The rod side chamber 5 and the piston side chamber 6 are communicated by the first passage 8, and the first opening/closing valve 9 is provided on midway of the first passage 8. The first passage 8 communicates the rod side chamber 5 with the piston side chamber 6 on the exterior of the cylinder 2, but may be provided in the piston 3 instead.

The first opening/closing valve 9 of the actuator unit 1A is a solenoid opening/closing valve. The first opening/closing valve 9 includes a valve 9a having a communicating position 9b, at which the first passage 8 is opened such that the rod side chamber 5 communicates with the piston side chamber 6, and a blocking position 9c, at which communication between the rod side chamber 5 and the piston side chamber 6 is blocked, a spring 9d configured to bias the valve 9a to adopt the blocking position 9c, and a solenoid 9e which, when energized, switches the valve 9a to the communicating position 9b against the spring 9d.

The piston side chamber 6 and the tank 7 are communicated by the second passage 10, and the second opening/closing valve 11, which is a solenoid opening/closing valve, is provided on midway of the second passage 10. The second opening/closing valve 11 includes a valve 11a having a communicating position 11b, at which the second passage 10 is opened such that the piston side chamber 6 communicates with the tank 7, and a blocking position 11c, at which communication between the piston side chamber 6 and the tank 7 is blocked, a spring 11d configured to bias the valve 11a to adopt the blocking position 11c, and a solenoid 11e which, when energized, switches the valve 11a to the communicating position 11b against the spring 11d.

The pump 12 is driven by the motor 15 so as to discharge the working oil in only one direction. A discharge port of the pump 12 communicates with the rod side chamber 5 via a supply passage 16, and an suction port communicates with the tank 7. When driven by the motor 15, the pump 12 suctions the working oil from the tank 7 and supplies the working oil to the rod side chamber 5. The motor 15 is driven to rotate upon reception of a current supplied from a controller C. Since the pump 12 discharges the working oil in only one direction, as described above, an operation to switch a rotation direction thereof is not required, and therefore a problem in which a discharge amount varies when the rotation direction is switched does not arise. Hence, an inexpensive gear pump or the like can be used as the pump 12. Further, since the rotation direction of the pump 12 is always the same direction, there is likewise no need to switch a rotation direction of the motor 15 serving as a drive source for driving the pump 12. Hence, the motor 15 does not require a high degree of responsiveness to a rotation direction switch, and therefore an inexpensive motor may likewise be used.

A check valve 17 that prevents backflow of the working oil from the rod side chamber 5 to the pump 12 is provided on midway of the supply passage 16.

The rod side chamber 5 and the tank 7 are communicated via the first discharge passage 18 and the second discharge passage 22. The first passive valve 19 having the first pressure-flow rate characteristic relative to the working oil flowing from the rod side chamber 5 into the tank 7 and the third opening/closing valve 24 serving as the switch valve are provided in series on midway of the first discharge passage 18. The second passive valve 23 having the second pressure-flow rate characteristic relative to the working oil flowing from the rod side chamber 5 into the tank 7 is provided on midway of the second discharge passage 22.

The first passive valve 19 provided on midway of the first discharge passage 18 includes a valve body 19a, and a spring 19b configured to bias the valve body 19a from a back surface side. The first passive valve 19 exerts a predetermined resistance on a flow of working oil supplied from the rod side chamber 5 on the upstream side. As shown by a solid line F1 and a dotted line F2 in FIG. 2, for example, the first passive valve 19 has the first pressure-flow rate characteristic, according to which pressure loss is determined unambiguously in relation to a flow rate passing through the valve. The first pressure-flow rate characteristic of the first passive valve 19 is not limited to the characteristic shown in FIG. 2, and may be any characteristic in which the pressure loss is determined unambiguously in relation to the flow rate.

The third opening/closing valve 24 of the actuator unit 1A is a solenoid opening/closing valve. The third opening/closing valve 24 includes a valve 24a having a communicating position 24b at which the first discharge passage 18 is open and a blocking position 24c at which the first discharge passage 18 is blocked, a spring 24d configured to bias the valve 24a to adopt the communicating position 24b, and a solenoid 24e which, when energized, switches the valve 24a to the blocking position 24c against the spring 24d. The third opening/closing valve 24 is provided on the tank side downstream of the first passive valve 19, but may be provided on the upstream side of the first passive valve 19.

The second passive valve 23 provided on midway of the second discharge passage 22 is constituted by an orifice, and exerts a predetermined resistance on a flow of working oil passing through the second discharge passage 22. The second passive valve 23, similarly to the first passive valve 19, has the second pressure-flow rate characteristic, according to which pressure loss is determined unambiguously in relation to the flow rate passing through the valve. As shown by a solid line F3 in FIG. 2, the second pressure-flow rate characteristic of the second passive valve 23 is a square-law characteristic. The second pressure-flow rate characteristic of the second passive valve 23 is not limited to the characteristic shown in FIG. 2, and may be any characteristic in which the pressure loss is determined unambiguously in relation to the flow rate and in which the pressure loss relative to the flow rate passing through the valve is larger than that of the first pressure-flow rate characteristic of the first passive valve 19.

The actuator unit 1A includes the rectifying passage 20 that allows the working oil to flow only from the piston side chamber 6 toward the rod side chamber 5, and the suction passage 21 that allows the working oil to flow only from the tank 7 toward the piston side chamber 6.

Next, operations of the actuator unit 1A will be described. As described above, when the actuator unit 1A is operated, the thrust generated on both the expansion and contraction sides of the actuator unit 1A can be controlled by controlling the pressure in the rod side chamber 5.

In one specific method, the thrust of the actuator unit 1A is controlled to a desired value by adjusting the pressure in the rod side chamber 5 using the second pressure-flow rate characteristic of the second passive valve 23.

For example, when the actuator unit 1A is to be caused to output desired thrust in an expansion direction, the first opening/closing valve 9 is set at the communicating position 9b, the second opening/closing valve 11 is set at the blocking position 11c, and the third opening/closing valve 24 is set at the blocking position 24c. Further, the motor 15 is driven to supply working oil from the pump 12 into the cylinder 2. Accordingly, the rod side chamber 5 and the piston side chamber 6 communicate with each other such that the working oil is supplied to both from the pump 12, and as a result, the piston 3 is pushed leftward in FIG. 1 such that the actuator unit 1A performs the expansion operation.

As described above, the thrust to be output by the actuator unit 1A and the pressure in the rod side chamber 5 have a proportional relationship, and therefore the pressure in the rod side chamber 5 corresponding to the thrust to be output serves as a target pressure. The target pressure is determined by calculation processing performed by the controller. The thrust to be output by the actuator unit 1A may be input into the controller C from a control apparatus of a upper order than the controller C, or may be calculated by the controller C in accordance with a predetermined control law.

Figure 2:
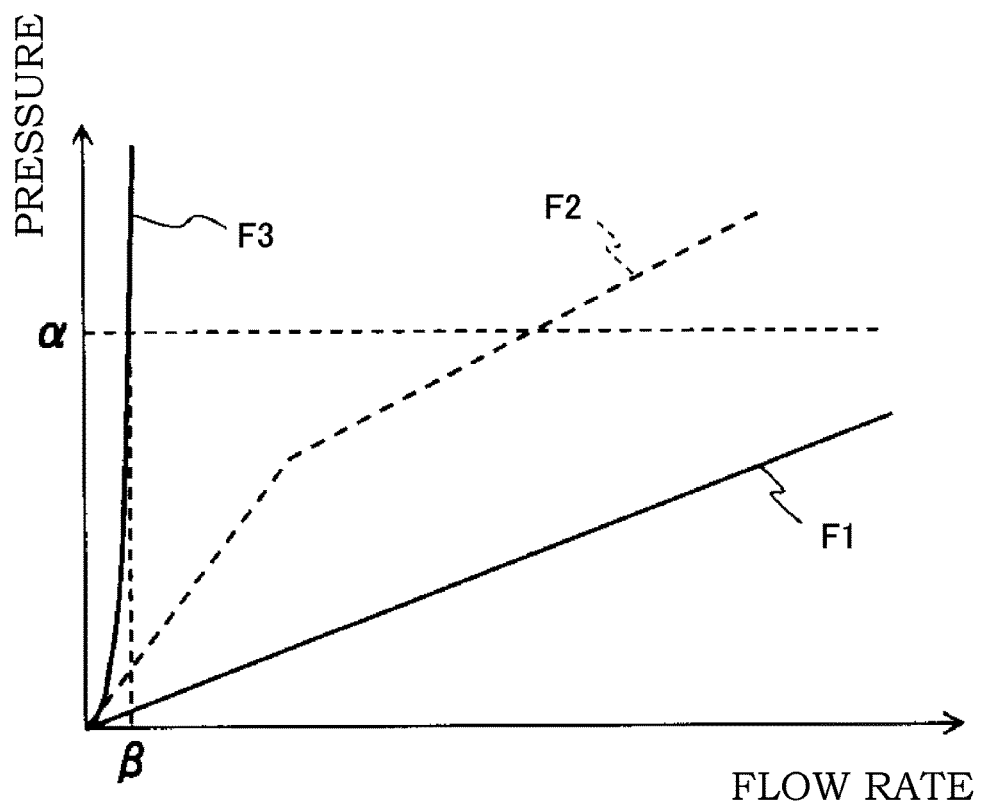
FIG. 2 is a view showing pressure-flow rate characteristics of a first passive valve and a second passive valve of the actuator unit according to the first embodiment of the present invention.

The second pressure-flow rate characteristic of the second passive valve 23 is used to set the pressure in the rod side chamber 5 at the target pressure. More specifically, a flow to be passed through the second passive valve 23 is determined from the target pressure, and working oil is supplied to the second passive valve 23 at the determined flow rate. To determine the flow rate from the target pressure, when a tank pressure is at atmospheric pressure and the target pressure is α, for example, the flow rate can be determined by reading a flow rate β corresponding to the pressure a from the pressure-flow rate characteristic of the second passive valve 23, as shown in FIG. 2. The flow rate corresponding to the target pressure may be determined by the controller C by performing a map calculation using the pressure-flow rate characteristic, or may be determined using a function having the target pressure as a parameter. In so doing, the pressure loss in the second passive valve 23 becomes equal to the target pressure. In other words, by supplying working oil at the flow rate determined in the manner described above, the pressure in the rod side chamber 5 upstream of the second passive valve 23 becomes higher than atmospheric pressure, i.e. the tank pressure, by an amount corresponding to the target pressure, and as a result, the pressure in the rod side chamber 5 upstream of the second passive valve 23 reaches the target pressure.

To describe this in further detail, the second opening/closing valve 11 is at the blocking position 11c, and therefore the working oil discharged from the pump 12 is returned to the tank 7 through the second passive valve 23 instead of flowing to the tank 7 via the cylinder 2. Hence, the pressure in the rod side chamber 5 increases above the pressure in the tank 7 by an amount corresponding to the pressure loss in the second passive valve 23, and as a result, the pressure in the rod side chamber 5 is controlled to the target pressure. By determining a discharge flow rate of the pump 12 at which the pressure in the rod side chamber 5 can reach the target pressure, a rotation speed of the motor 15 is determined unambiguously. By controlling the motor 15 to the determined rotation speed, the pressure in the rod side chamber 5 is adjusted to the target pressure, and as a result, the thrust of the actuator unit 1A is controlled to a desired magnitude.

Hence, the controller C determines the flow rate of the second passive valve 23 from the target pressure, determines the rotation speed of the motor 15 from the determined flow rate, and controls the motor 15 to the determined rotation speed. The rotation speed of the motor 15 may be controlled through feedback control by monitoring the rotation speed of the motor 15. When the motor 15 is an AC motor or a brushless motor, the rotation speed may be monitored using a sensor that senses a position of a rotor of the motor 15. When the motor 15 is a brush motor not having a sensor for monitoring the rotation speed, a sensor for monitoring the rotation speed may be provided separately. It should be noted that when the tank pressure is not at atmospheric pressure, a flow rate corresponding to a differential pressure between the target pressure and the tank pressure may be read from the pressure-flow rate characteristic diagram shown in FIG. 2, and the rotation speed of the motor 15 may be controlled such that the pump 12 discharges the read flow rate. In so doing, the pressure loss in the second passive valve 23 becomes equal to the differential pressure between the target pressure and the tank pressure such that the pressure on the upstream side of the second passive valve 23 becomes higher than the tank pressure by an amount corresponding to the difference. As a result, the pressure in the rod side chamber 5 upstream of the second passive valve 23 reaches the target pressure.

Conversely, when the actuator unit 1A is to be caused to output desired thrust in a contraction direction, the first opening/closing valve 9 is set at the blocking position 9b, the second opening/closing valve 11 is set at the communicating position 11b, and the third opening/closing valve 24 is set at the blocking position 24c. Further, the motor 15 is driven to supply working oil from the pump 12 into the cylinder 2. Accordingly, the piston side chamber 6 and the tank 7 communicate with each other whereas the rod side chamber 5 is blocked from the piston side chamber 6, and therefore the working oil is supplied from the pump 12 only to the rod side chamber 5. As a result, the piston 3 is pushed rightward in FIG. 1 such that the actuator unit 1A performs the contraction operation.

Likewise in this case, the thrust to be output by the actuator unit 1A and the pressure in the rod side chamber 5 have a proportional relationship, as described above, and therefore the pressure in the rod side chamber 5 corresponding to the thrust to be output serves as the target pressure. Similarly to the case described above, the pressure in the rod side chamber 5 can be set at the target pressure using the second pressure-flow rate characteristic of the second passive valve 23. Likewise in this case, the first opening/closing valve 9 is at the blocking position 9c, and therefore the working oil discharged from the pump 12 is returned to the tank 7 through the second passive valve 23 instead of flowing into the tank 7 via the cylinder 2. Hence, similarly to the case described above, by determining the discharge flow rate of the pump 12, determining the rotation speed of the motor 15 from the determined discharge flow rate, and controlling the motor 15 to the determined rotation speed, the pressure in the rod side chamber 5 is adjusted to the target pressure, and as a result, the thrust of the actuator unit 1A is controlled to the desired magnitude.

When the actuator unit 1A expands, the amount of working oil in the cylinder 2 is insufficient, and therefore working oil is supplied to the cylinder 2 from the pump 12. Further, when the actuator unit 1A contracts, the amount of working oil in the cylinder 2 is excessive, and therefore working oil is discharged from the cylinder 2 into the tank 7 via the first discharge passage 18. In other words, the flow rate passing through the second passive valve 23 varies as the actuator unit 1A expands and contracts, and therefore, when an expansion/contraction speed of the actuator unit 1A increases, a control response by which the pressure in the rod side chamber 5 follows the target pressure deteriorates. Hence, by providing a pressure sensor that detects the pressure in the rod side chamber 5 and controlling the rotation speed of the motor 15 by feeding back the pressure in the rod side chamber 5, the ability of the pressure in the rod side chamber 5 to follow the target pressure can be improved.

Next, a method of controlling the thrust of the actuator unit 1A to a desired value by adjusting the pressure in the rod side chamber 5 through control of a torque of the motor 15 will be described as a second specific method of operating the actuator unit 1A.

When the actuator unit 1A is to be caused to output desired thrust in the expansion direction, the first opening/closing valve 9 is set at the communicating position 9b, the second opening/closing valve 11 is set at the blocking position 11c, and the third opening/closing valve 24 is set at the blocking position 24c. Further, the motor 15 is driven to supply working oil from the pump 12 into the cylinder 2. Accordingly, the rod side chamber 5 and the piston side chamber 6 communicate with each other such that the working oil is supplied to both from the pump 12, and as a result, the piston 3 is pushed leftward in FIG. 1 such that the actuator unit 1A performs the expansion operation.

By adjusting the torque of the motor 15 using the controller C together with this operation, the pressure in the rod side chamber 5 is adjusted such that the value obtained by multiplying the pressure in the rod side chamber 5 by the pressure receiving surface area difference between the rod side chamber 5 side and the piston side chamber 6 side of the piston 3 reaches the desired thrust. The pump 12 is driven by the torque of the motor 15 such that the pump 12 receives the pressure in the rod side chamber 5, and therefore, by adjusting the torque of the motor 15, which is commensurate with the discharge pressure of the pump 12, the pressure in the rod side chamber 5 can be controlled.

Figure 3:
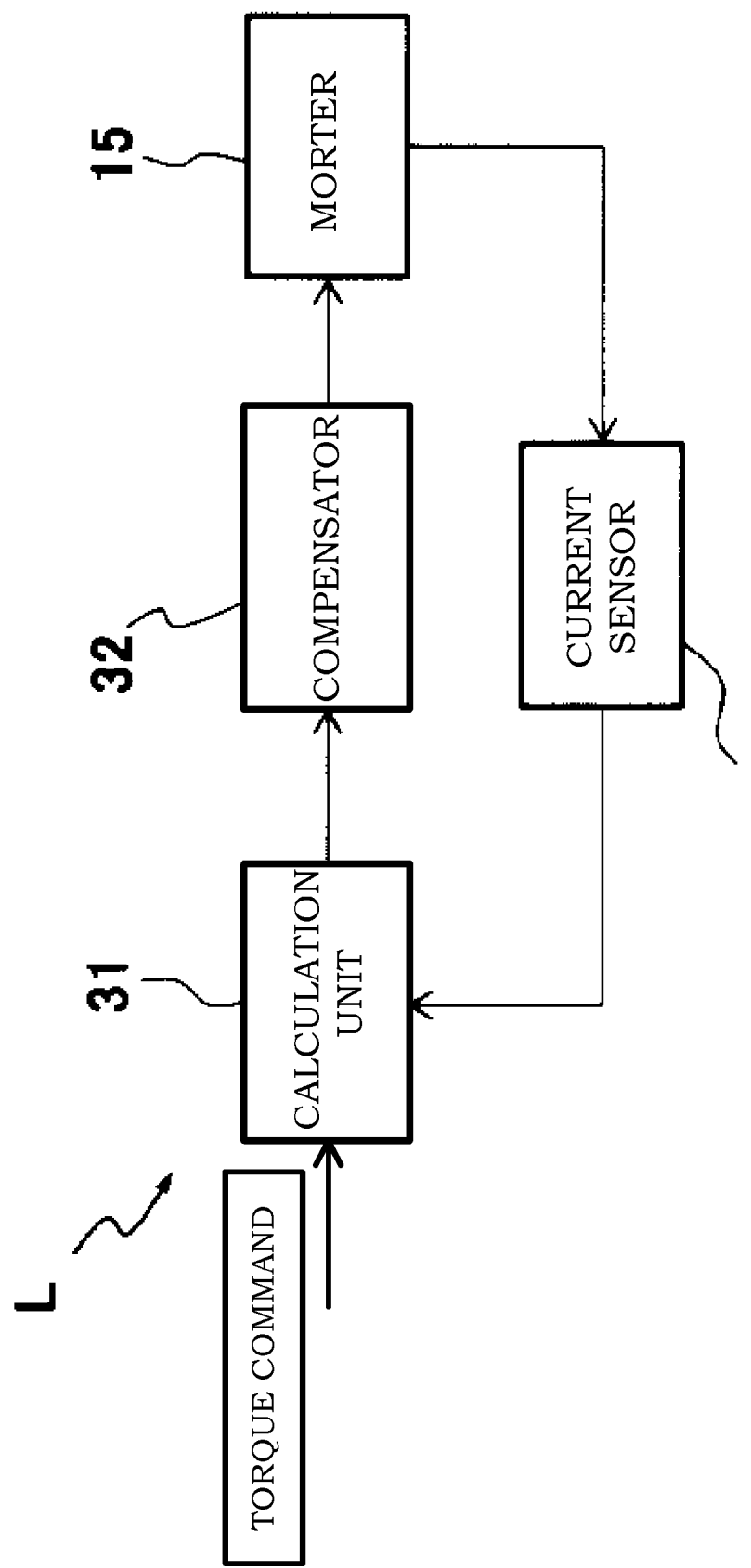
FIG. 3 is a view showing an example of a current loop of the actuator unit according to the first embodiment of the present invention.

More specifically, as shown in FIG. 3, the controller C includes a current loop L that controls a current flowing through the motor 15 upon reception of an input torque command. The current loop L includes a current sensor 30 that detects a current flowing through a winding, not shown in the figure, of the motor 15, a calculation unit 31 that calculates a deviation between the torque command and the current detected by the current sensor 30, and a compensator 32 that generates a current command from the deviation determined by the calculation unit 31. The compensator 32 performs a conventional type of compensation such as proportional integral compensation or proportional differential integral compensation, for example, but may perform another type of compensation.

Figure 4:
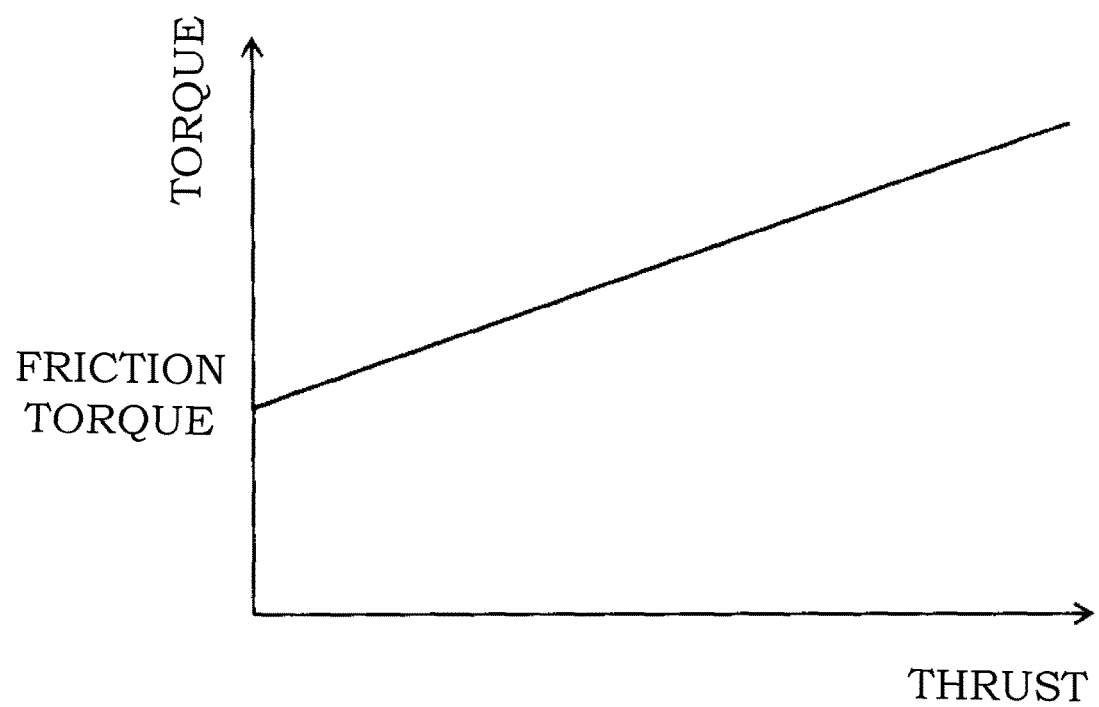
FIG. 4 is a view showing a relationship between thrust generated by the actuator unit and torque generated by a motor according to the first embodiment of the present invention.

The controller C determines the target pressure, i.e. the pressure in the rod side chamber 5 corresponding to the thrust to be output by the actuator unit 1A, determines a required torque, which is a torque required to realize the target pressure, and determines a current command for realizing the required torque as the torque command. It should be noted that the target pressure may be determined from the thrust, the required torque may be determined from the target pressure, and the torque command, i.e. the current command, may be determined from the required torque. In actuality, therefore, the controller C can determine the torque command directly from the thrust using as a parameter. More specifically, as shown in FIG. 4, a relationship between the torque of the motor 15 and the thrust can be approximated by a primary expression having a friction torque of the pump 12 as an intercept, and therefore the torque command can be determined easily from the thrust. The thrust and the torque command are input into the current loop L described above, whereupon a current is supplied to the motor 15, and as a result, the torque of the motor 15 is controlled in accordance with the torque command. The pressure in the rod side chamber 5 is thereby adjusted to the target pressure, and as a result, the thrust output by the actuator unit 1A is controlled to the magnitude of the desired thrust.

Conversely, when the actuator unit 1A is to be caused to output desired thrust in the contraction direction, the first opening/closing valve 9 is set at the blocking position 9c, the second opening/closing valve 11 is set at the communicating position 11b, and the third opening/closing valve 24 is set at the blocking position 24c. Further, the motor 15 is driven to supply working oil from the pump 12 into the cylinder 2. Accordingly, the piston side chamber 6 and the tank 7 communicate with each other whereas the rod side chamber 5 is blocked from the piston side chamber 6, and therefore the working oil is supplied from the pump 12 only the rod side chamber 5. As a result, the piston 3 is pushed rightward in FIG. 1 such that the actuator unit 1A performs the contraction operation.

Together with this operation, similarly to the procedures described above, the pressure in the rod side chamber 5 may be adjusted by adjusting the torque of the motor 15 using the controller C such that the value obtained by multiplying the pressure in the rod side chamber 5 by the pressure receiving surface area on the rod side chamber 5 side of the piston 3 becomes identical to the desired thrust.

Furthermore, when the pump 12 is not driven and the actuator unit 1A is caused to function as a damper, the first opening/closing valve 9 and the second opening/closing valve 11 are both set at the blocking positions 9c, 11c, and the third opening/closing valve is set at the communicating position 24b. When the actuator unit 1A expands and contracts, working oil is pushed out from the cylinder 2 and discharged into the tank 7 via the first passive valve 19. When the amount of working oil in the cylinder 2 is insufficient, working oil is supplied to the cylinder 2 from the tank 7 through the suction passage 21. Accordingly, the actuator unit 1A generates a damping force corresponding to the pressure loss of the first passive valve 19.

Hence, the actuator unit 1A can generate thrust in both the expansion direction and the contraction direction, and the thrust can be controlled easily even without the use of a variable relief valve. Further, in the actuator unit 1A, the second pressure-flow rate characteristic of the second passive valve 23 is set such that the pressure loss relative to the flow rate passing through the valve is larger than that of the first pressure-flow rate characteristic of the first passive valve 19, and the first discharge passage 18 on which the first passive valve 19 is provided can be blocked by the third opening/closing valve (the switch valve) 24. Hence, the pressure-flow rate characteristic of the first passive valve 19 can be set at an optimum characteristic for realizing a desired damping characteristic (damping force variation relative to piston speed) in the actuator unit 1A. For example, when the actuator unit 1A is caused to generate thrust (i.e. to function as an actuator) in a case where the pressure-flow rate characteristic of the first passive valve 19 is as shown by the solid line F1 in FIG. 2, the pressure in the rod side chamber 5 can be set at the target pressure with a small discharge amount from the pump 12 by blocking the first discharge passage 18. Further, a variation rate of the motor speed can be reduced to enable an improvement in responsiveness, the durability of the pump 12 can be improved, and noise from the pump 12 can be suppressed. Furthermore, when the actuator unit 1A is caused to function as a damper, a desired damping characteristic can be realized in the actuator unit 1A by communicating the first discharge passage 18.

Hence, by adjusting the discharge amount of the pump 12 using the first and second passive valves 19, 23 in order to control the pressure in the cylinder 2, a desired damping characteristic can be realized easily in the actuator unit 1A.

Moreover, in this embodiment, the second passive valve 23 is an orifice, and an orifice region is provided. Therefore, when the actuator unit 1A is caused to function as an actuator, the rotation speed of the motor 15 can be maintained at or above zero. Hence, an increase in power consumption and a reduction in the lifespan of a bearing due to repeated stopping and acceleration of the motor 15 can be suppressed.

Furthermore, in this embodiment, the check valve 17 is provided on midway of the supply passage 16 downstream of the pump 12, and therefore, even when the actuator unit 1A is caused to expand and contract forcibly by an external force, backflow of the working oil from the rod side chamber 5 into the pump 12 can be prevented. As a result, a thrust equal to or exceeding the thrust generated in accordance with the torque of the motor 15 can be obtained.

Next, an actuator unit 1B according to a second embodiment of the present invention will be described. The actuator unit 1B according to the second embodiment is configured basically identically to the actuator unit 1A according to the first embodiment, and therefore similar configurations to the first embodiment have been allocated identical reference symbols, and description thereof has been omitted. The actuator unit 1B according to the second embodiment includes a third passive valve 25 provided on midway of the second discharge passage 22 in parallel with the second passive valve 23, and a fourth opening/closing valve 26 configured to communicate and block the second discharge passage 22. The fourth opening/closing valve 26 and the third opening/closing valve 24 correspond to the switch valve of claim 1.

When the actuator unit 1B performs the expansion operation, the pump 12 is driven by the motor 15 in a condition where the first passage 8 is set in the communicative condition by the first opening/closing valve 9 and the second opening/closing valve 11 is closed. By supplying working oil to the cylinder 2 in this condition, the actuator unit 1B can be caused to perform the expansion operation. When the actuator unit 1B performs the contraction operation, on the other hand, the pump 12 is driven by the motor 15 in a condition where the second passage 10 is set in the communicative condition by the second opening/closing valve 11 and the first opening/closing valve 9 is closed. By supplying working oil to the cylinder 2 in this condition, the actuator unit 1B can be caused to perform the contraction operation.

In the actuator unit 1B, the second discharge passage 22 includes a main passage 22a, and a branch passage 22b that branches from the main passage 22a and then converges with the main passage 22a. The second passive valve 23 constituted by an orifice is provided on midway of the main passage 22a, and the third passive valve 25 is provided on midway of the branch passage 22b.

Figure 6:
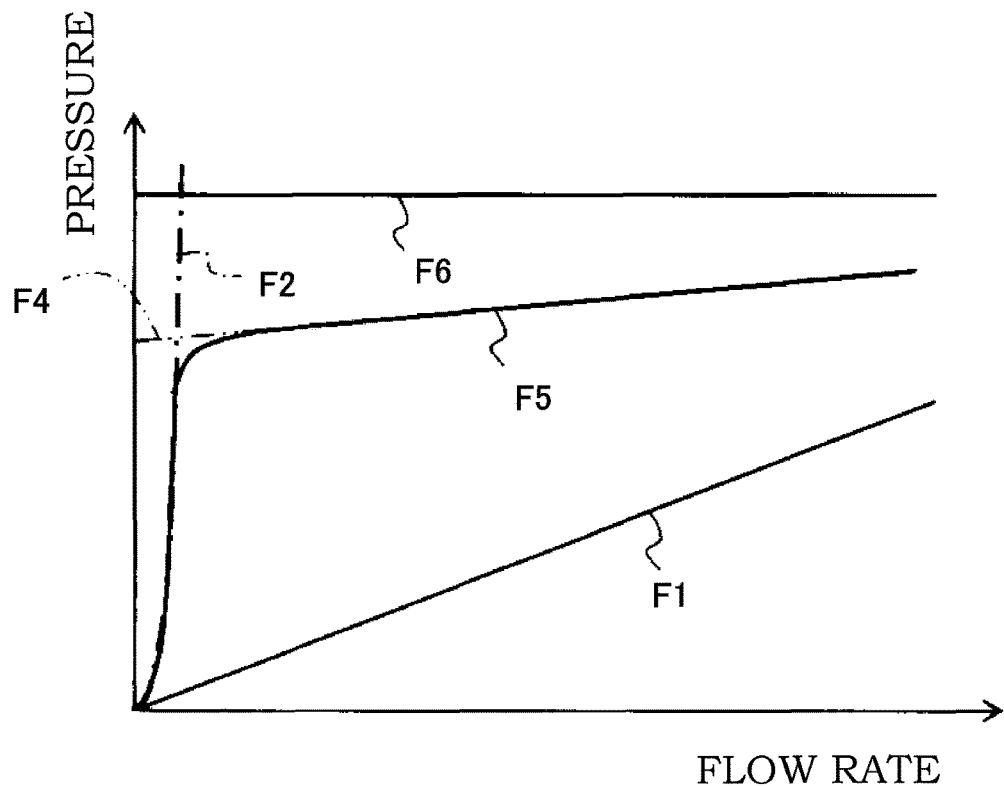
FIG. 6 is a view showing a pressure-flow rate characteristic of a first passive valve and a synthesized pressure-flow rate characteristic of a second passive valve and a third passive valve in the actuator unit according to the second embodiment of the present invention.

The third passive valve 25 is a relief valve including a valve body 25a and a spring 25b configured to bias the valve body 25a in a direction for blocking the main passage 22a. When the pressure in the rod side chamber 5 upstream of the second discharge passage 22, which acts on the valve body 25a, exceeds a valve opening pressure, thrust generated by the pressure in the rod side chamber 5, which presses the valve body 25a in a direction for opening the main passage 22a, overcomes the biasing force of the spring 25b such that the valve body 25a retreats, thereby opening the main passage 22a. The third passive valve 25 has a third pressure-flow rate characteristic according to which pressure loss is determined unambiguously in relation to the flow rate passing through the valve. As shown by a dot-dot-dash line F4 in FIG. 6, the third pressure-flow rate characteristic is set such that the pressure loss relative to the flow rate passing through the valve is larger than that of the first pressure-flow rate characteristic of the first passive valve 19 (solid line F1 in FIG. 6). Further, the third pressure-flow rate characteristic is set such that a pressure corresponding to the flow rate passing through the valve is on a lower side of a pressure obtained when the torque of the motor 15, shown by a solid line F6 in FIG. 6, is at a maximum. In other words, the third pressure-flow rate characteristic is set such that the pressure corresponding to the flow rate passing through the valve does not exceed the pressure obtained when the torque of the motor 15 is at a maximum.

As described above, the pressure-flow rate characteristic of the second passive valve 23 constituted by an orifice is a square-law characteristic such as that shown by a dot-dash line F3 in FIG. 6. As shown by a solid line F5 in FIG. 6, therefore, the pressure-flow rate characteristic obtained when the working oil flows through the second discharge passage 22 is a synthesized characteristic of the respective pressure-flow rate characteristics of the second passive valve 23 and the third passive valve 25.

The fourth opening/closing valve 26 constituting the switch valve together with the third opening/closing valve 24 is a solenoid opening/closing valve. The fourth opening/closing valve 26 includes a valve 26a having a communicating position 26b at which both the main passage 22a and the branch passage 22b are open and a blocking position 26c at which both the main passage 22a and the branch passage 22b are blocked, a spring 26d configured to bias the valve 26a to adopt the blocking position 26c, and a solenoid 26e which, when energized, switches the valve 26a to the communicating position 26b against the spring 26d. The fourth opening/closing valve 26 is provided on the tank side downstream of the second passive valve 23 and the third passive valve 25, but may be provided on the upstream side of the second passive valve 23 and the third passive valve 25.

Next, operations of the actuator unit 1B will be described. As described above, when the actuator unit 1B is operated, the thrust on both the expansion and contraction sides of the actuator unit 1B can be controlled by controlling the pressure in the rod side chamber 5.

In a first specific method, the thrust generated by the actuator unit 1B is controlled to a desired value by adjusting the pressure in the rod side chamber 5 using the synthesized pressure-flow rate characteristic of the second passive valve 23 and the third passive valve 25. This control method is similar to the case of the first embodiment in which the thrust of the actuator unit 1A is controlled to a desired value using the pressure-flow rate characteristic of the second passive valve 23, and therefore detailed description thereof has been omitted here.

Further, in a second specific method of operating the actuator unit 1B, the thrust of the actuator unit 1B is controlled to a desired value by adjusting the pressure in the rod side chamber 5 through control of the torque of the motor 15. This control method is similar to the case of the first embodiment in which the thrust of the actuator unit 1A is controlled to a desired value by controlling the torque of the motor 15, and therefore detailed description thereof has likewise been omitted here.

Figure 5:
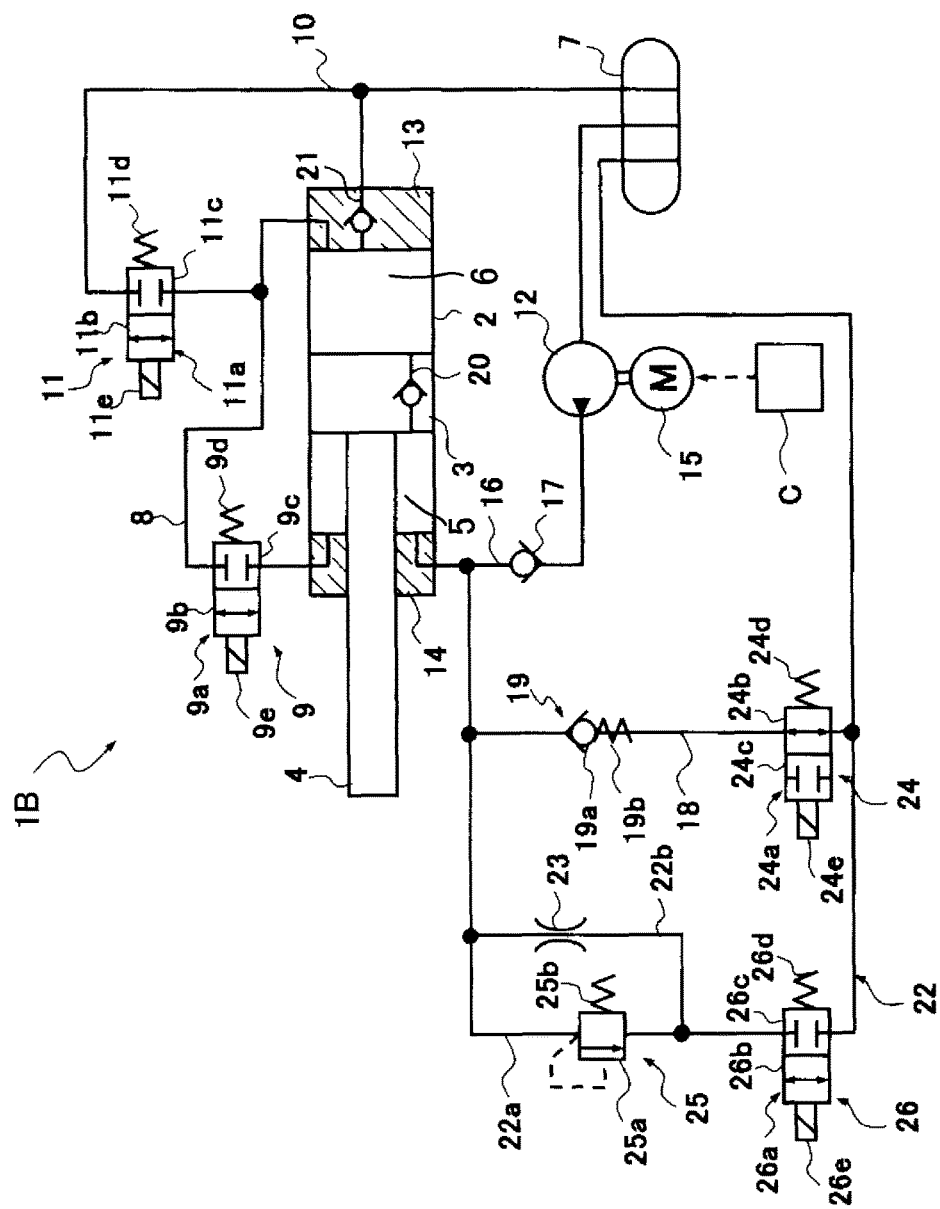
FIG. 5 is a circuit diagram showing an actuator unit according to a second embodiment of the present invention.

Regardless of the method used to control the thrust of the actuator unit 1B to the desired value, when the actuator unit 1B is to be caused to output desired thrust in the expansion direction, the first opening/closing valve 9 is set at the communicating position 9b and the second opening/closing valve 11 is set at the blocking position 11c. Further, the third opening/closing valve 24 is set at the blocking position 24c, and the fourth opening/closing valve 26 is set at the communicating position 26b. The motor 15 is then driven to supply working oil to the cylinder 2 from the pump 12. As a result, the rod side chamber 5 and the piston side chamber 6 are set in a communicative condition such that working oil is supplied to both from the pump 12, and therefore the piston 3 is pushed leftward in FIG. 5 such that the actuator unit 1B performs the expansion operation.

Conversely, when the actuator unit 1B is to be caused to output desired thrust in the contraction direction, regardless of the method used to control the thrust of the actuator unit 1B to the desired value, the first opening/closing valve 9 is set at the blocking position 9c and the second opening/closing valve 11 is set at the communicating position 11b. Further, the third opening/closing valve 24 is set at the blocking position 24c, and the fourth opening/closing valve 26 is set at the communicating position 26b. The motor 15 is then driven to supply working oil to the cylinder 2 from the pump 12. As a result, the piston side chamber 6 and the tank 7 communicate with each other whereas the rod side chamber 5 is blocked from the piston side chamber 6, and therefore working oil is supplied only to the rod side chamber 5 from the pump 12. Accordingly, the piston 3 is pushed rightward in FIG. 5 such that the actuator unit 1B performs the contraction operation.

Furthermore, when the pump 12 is not driven and the actuator unit 1B is caused to function as a damper, the first opening/closing valve 9, the second opening/closing valve 11, and the fourth opening/closing valve 26 are all set at their blocking positions 9c, 11c, 26c, while the third opening/closing valve 24 is set at the communicating position 24b. When the working oil is pushed out from the cylinder 2 due to the expansion and contraction of the actuator unit 1B in this condition, the working oil is discharged into the tank 7 via the first passive valve 19. When the amount of working oil in the cylinder 2 is insufficient, working oil is supplied to the cylinder 2 from the tank 7 through the suction passage 21. Accordingly, the actuator unit 1B generates a damping force corresponding to the pressure loss in the first passive valve 19.

Similarly to the first embodiment, therefore, the actuator unit 1B can generate thrust in both the expansion direction and the contraction direction, and the thrust can be controlled easily even without the use of a variable relief valve.

In other words, likewise in the actuator unit 1B, by providing the first, second, and third passive valves 19, 23, 25 having pressure-flow rate characteristics according to which the pressure loss is determined unambiguously in relation to the flow rate passing through the valves, the pressure in the cylinder 2 can be controlled by adjusting the discharge amount of the pump 12 without the use of a variable relief valve, and as a result, reductions in size and cost can be achieved.

Further, in the actuator unit 1B, the synthesized pressure-flow rate characteristic of the second passive valve 23 and the third passive valve 25 is set such that the pressure loss relative to the flow rate passing through the valves is larger than that of the first pressure-flow rate characteristic of the first passive valve 19, and the first discharge passage 18 on which the first passive valve 19 is provided can be blocked. Therefore, the pressure-flow rate characteristic of the first passive valve 19 can be set at an optimum characteristic for realizing a desired damping characteristic (damping force variation relative to piston speed) in the actuator unit 1B. For example, when the pressure-flow rate characteristic of the first passive valve 19 is a characteristic such as that shown by the solid line F1 in FIG. 2 and the actuator unit 1B is caused to generate thrust (i.e. to function as an actuator), the pressure in the rod side chamber 5 can be set at the target pressure with a small discharge amount from the pump 12 by blocking the first discharge passage 18. Further, the variation rate of the motor speed can be reduced to enable an improvement in responsiveness, the durability of the pump 12 can be improved, and noise from the pump 12 can be suppressed. Furthermore, when the actuator unit 1B is caused to function as a damper, the desired damping characteristic can be realized by communicating the first discharge passage 18.

Hence, by adjusting the discharge amount of the pump 12 using the first, second, and third passive valves 19, 23, 25 in order to control the pressure in the cylinder 2, the desired damping characteristic can be realized easily.

Moreover, in the actuator unit 1B, the third passive valve 25 is constituted by a relief valve, and therefore the pressure in the rod side chamber 5 when the first discharge passage 18 is blocked can be kept smaller than the pressure when the torque of the motor 15 is at a maximum. As a result, a situation in which the command torque exceeds the torque of the motor 15 when a high thrust command is issued such that the motor 15 stalls can be avoided.

Further, in the actuator unit 1B, similarly to the actuator unit 1A, the second passive valve 23 is constituted by an orifice, and an orifice region is provided. Therefore, when the actuator unit 1B is caused to function as an actuator, the rotation speed of the motor 15 can be maintained at or above zero. Hence, an increase in power consumption and a reduction in the lifespan of the bearing due to repeated stopping and acceleration of the motor 15 can be suppressed.

Furthermore, likewise in the actuator unit 1B, the check valve 17 is provided on midway of the supply passage 16 downstream of the pump 12, and therefore, even when the actuator unit 1B is caused to expand and contract forcibly by an external force, backflow of the working oil from the rod side chamber 5 into the pump 12 can be prevented. As a result, a thrust equal to or exceeding the thrust generated in accordance with the torque of the motor 15 can be obtained.

Embodiments of this invention were described above, but the above embodiments are merely examples of applications of this invention, and the technical scope of this invention is not limited to the specific constitutions of the above embodiments.

For example, in the first embodiment, an air vent hole through which air in the cylinder 2 can escape may be used as the second passive valve 23. In the second embodiment, it is difficult to use an air vent hole through which the air in the cylinder 2 can escape as the second passive valve 23, and therefore an air vent orifice through which air can escape may be added to the configuration described above.

Further, in a case where the thrust of the actuator unit 1A, 1B is controlled to a desired value by adjusting the pressure in the rod side chamber 5 through control of the torque of the motor 15, the second passive valve 23 may be constituted by a relief valve configured similarly to the third passive valve 25, and not provided parallel to the orifice. In this case, however, it is difficult to perform control in a region at or below a starting torque of the pump 12.

Furthermore, in the first embodiment, the second discharge passage 22 is normally communicative. Instead, however, an opening/closing valve may be provided on the second discharge passage 22 as the switch valve. In this case, the opening/closing valve may communicate the second discharge passage 22 when the actuator unit 1A is caused to function as an actuator, and either communicate or block the second discharge passage 22 when the actuator unit 1A is caused to function as a damper.

Moreover, in a case where both the first discharge passage 18 and the second discharge passage 22 are communicated when the actuator unit 1A is caused to function as a damper, as in the first embodiment, the pressure loss generated by the first passive valve 19 may be set to be identical to the pressure loss generated by the second passive valve 23. In this case, when the actuator unit 1A is caused to function as an actuator, the pressure in the rod side chamber 5 can be set at the target pressure with a small discharge amount from the pump 12 by blocking the first discharge passage 18. When an opening/closing valve is provided on both the first discharge passage 18 and the second discharge passage 22 as the switch valve and the actuator unit is caused to function as an actuator, the pressure in the rod side chamber 5 can be set at the target pressure with a small discharge amount from the pump 12 by blocking either one of the passages.

Figure 7:
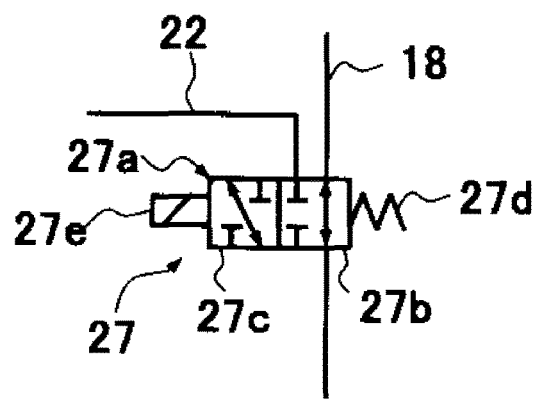
FIG. 7 is a view showing a modified example of a switch valve in the actuator unit according to the second embodiment of the present invention.
Figure 8:
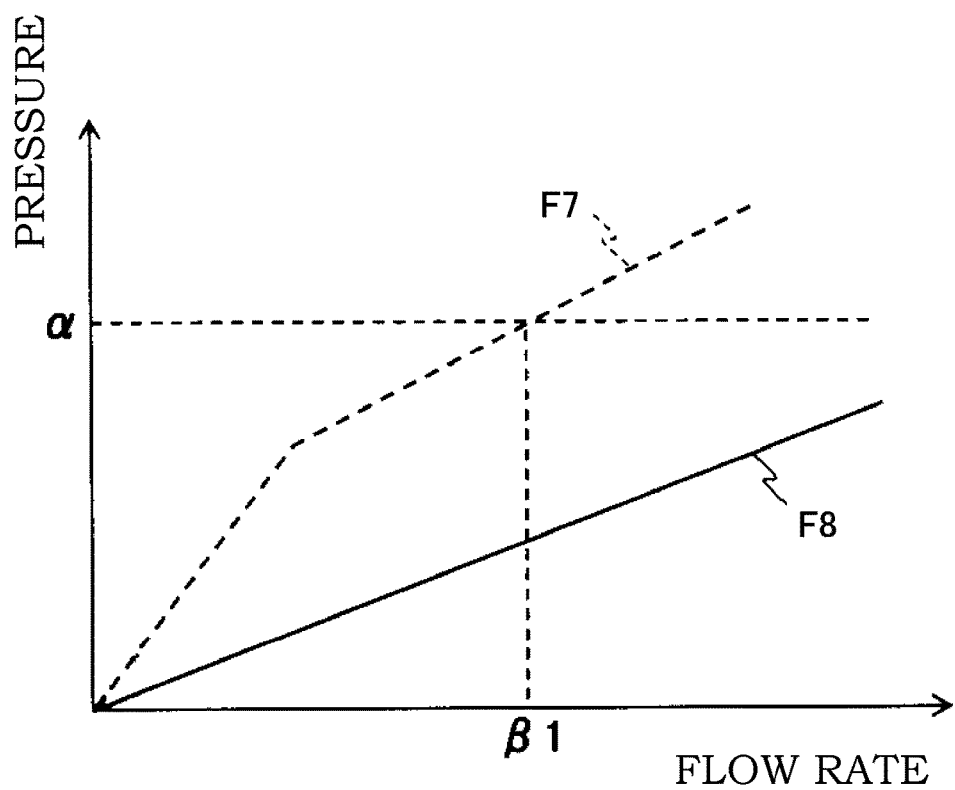
FIG. 8 is a view showing an example of a pressure-flow rate characteristic of a passive valve.

Furthermore, in the second embodiment, the switch valve is constituted by the third opening/closing valve 24 and the fourth opening/closing valve 26, but as shown in FIG. 7, the switch valve may be a solenoid direction control valve 27 that includes a valve 27a having a first position 27b, at which the first discharge passage 18 is communicated and the second discharge passage 22 is blocked, and a second position 27c, at which the first discharge passage 18 is blocked and the second discharge passage 22 is communicated, a spring 27d configured to bias the valve 27a to adopt the first position 27b, and a solenoid 27e which, when energized, switches the valve 27a to the second position 27c against the spring 27d.

Furthermore, in the above embodiments, solenoid valves are used as the first, second, third, and fourth opening/closing valves 9, 11, 24, 26, but valves other than solenoid valves, such as mechanical valves, may be used instead.

This application claims priority based on Japanese Patent Application No. 2013-035238 filed with the Japan Patent Office on Feb. 26, 2013, the entire contents of which are incorporated into this specification.

The invention claimed is:

1. An actuator unit comprising:
    a cylinder;
    a piston slidably inserted into the cylinder, the piston defining a rod side chamber and a piston side chamber in the cylinder;
    a rod inserted into the cylinder and coupled to the piston;
    a tank;
    a first opening/closing valve provided on a first passage that communicates the rod side chamber with the piston side chamber;
    a second opening/closing valve provided on a second passage that communicates the piston side chamber with the tank;
    an suction passage configured to allow a working fluid to flow only from the tank toward the piston side chamber;
    a rectifying passage configured to allow the working fluid to flow only from the piston side chamber toward the rod side chamber;
    a pump configured to supply the working fluid to the rod side chamber;
    a motor configured to drive the pump;
    a first discharge passage and a second discharge passage that respectively communicate the rod side chamber to the tank;
    a first passive valve provided on the first discharge passage, the first passive valve having a first pressure-flow rate characteristic, wherein a first pressure loss according to the first pressure-flow rate characteristic is determined unambiguously in relation to a first flow rate through the first passive valve;
    a second passive valve provided on the second discharge passage, the second passive valve having a second pressure-flow rate characteristic, wherein a second pressure loss according to the second pressure-flow rate characteristic is determined unambiguously in relation to a second flow rate through the second passive valve; and
    a switch valve provided on the first discharge passage in series with the first passive valve, the switch valve being configured to communicate and block at least one of the first discharge passage and the second discharge passage,
    wherein the second pressure-flow rate characteristic of the second passive valve is set such that the second pressure loss is larger than the first pressure loss.

2. The actuator unit according to claim 1, wherein, when the pump is driven with one of the first opening/closing valve and the second opening/closing valve at a communicating position, the switch valve blocks one of the first discharge passage and the second discharge passage, and when driving of the pump is stopped with both the first opening/closing valve and the second opening/closing valve at a blocking position, the switch valve communicates one of the first discharge passage and the second discharge passage.

3. The actuator unit according to claim 1, wherein the second passive valve is constituted by an orifice.

4. The actuator unit according to claim 1, further comprising a third passive valve provided on the second discharge passage in parallel with the second passive valve, the third passive valve having a third pressure-flow rate characteristic,
    wherein the switch valve communicates and blocks the first discharge passage and the second discharge passage,
    wherein the third passive valve is constituted by a relief valve, and
    wherein the third pressure-flow rate characteristic is set such that a third pressure loss relative to a third flow rate passing through the third passive valve is larger than the first pressure loss relative to the first flow rate of the first pressure-flow rate characteristic of the first passive valve, and such that a pressure in the rod side chamber when the first discharge passage is blocked is less than the pressure in the rod side chamber when a torque of the motor is at a maximum.

5. The actuator unit according to claim 1, wherein the switch valve is a solenoid valve which, when not energized, communicates at least one of the first discharge passage and the second discharge passage.

* * * * *